United States Patent [19]

Stone

[11] Patent Number: 4,830,451
[45] Date of Patent: May 16, 1989

[54] TECHNIQUE AND APPARATUS FOR FABRICATING A FIBER FABRY-PEROT ETALON

[75] Inventor: Julian Stone, Rumson, N.J.

[73] Assignees: American Telephone and Telegraph Company, New York, N.Y.; AT&T Bell Laboratories, Murray Hill, N.J.

[21] Appl. No.: 836,497

[22] Filed: Mar. 5, 1986

[51] Int. Cl.$^4$ .............................................. G02F 1/21
[52] U.S. Cl. .............................. 350/96.15; 350/96.29; 356/352
[58] Field of Search ............... 350/96.15, 96.29, 96.18, 350/96.13, 354, 355; 356/352, 345

[56] References Cited

U.S. PATENT DOCUMENTS

| | | | |
|---|---|---|---|
| 3,910,677 | 10/1975 | Becker et al. | 350/96.18 |
| 4,012,699 | 3/1977 | Gibbs et al. | 350/354 X |
| 4,329,058 | 5/1982 | James et al. | 356/352 |
| 4,480,394 | 4/1983 | Stowe | 356/358 |
| 4,482,248 | 11/1984 | Papuchon et al. | 356/346 |
| 4,515,429 | 5/1985 | Smith et al. | 350/96.13 |
| 4,558,923 | 12/1985 | Hoffman et al. | 350/354 |
| 4,572,669 | 2/1986 | James et al. | 356/352 |

OTHER PUBLICATIONS

Koo et al., "Characteristics of Fiber-Optic Magnetic-Field Sensors Employing Metallic Glasses", *Optics Letters*, vol. 7, No. 7, Jul. 1982, pp. 334-336.
Leilabady et al., "Monomode Fiber-Optic Strain Gauge with Simultaneous Phase- and Polarization-State Detection", *Optics Letters*, vol. 10, No. 11, Nov. 1985, pp. 576-578.
BSTJ, vol. 56, No. 5, May-Jun. 1977, "Loss Analysis of Single-Mode Fiber Splices", D. Marcuse, pp. 703-718.
IEEE J. Quantum Electronics, vol. QE-17, No. 11, Nov. 1981, "A Sensitive Fiber Optic Fabry-Perot Interferometer", S. J. Petuchowski et al., pp. 2168-2170.
Applied Optics, vol. 20, No. 23, Dec. 1, 1981, "Long Optical-Fiber Fabry-Perot Interferometers", D. L. Franzen et al., pp. 3991-3992.
Electronics Letters, vol. 21, No. 11, May 23, 1985, "Optical Fibre Fabry-Perot Interferometer with Finesse of 300", J. Stone, pp. 504-505.

*Primary Examiner*—John D. Lee
*Attorney, Agent, or Firm*—Samuel H. Dworetsky

[57] ABSTRACT

A practical, manufacturable Fabry-Perot etalon and method for fabricating the same is disclosed. The plastic coating material is removed from the ends of a predetermined length of single mode fiber. A small area of the glass fiber is exposed by scraping away the coating near the center of the fiber on one side, and the fiber is then broken at this point forming a small gap. The remaining coating holds the broken fiber together and automatically matches the pieces in alignment. Mirrors of desired relfectivity are applied to the polished fiber ends, either by gluing on discrete mirrors or by applying multilayer dielectric coatings. The fiber/mirror structure is mounted onto a piezoelectric substrate. A voltage is applied to the piezoelectric substrate, causing longitudinal expansion of the fiber gap and providing the scanning means to obtain a spectrum of resonant wavelengths.

11 Claims, 2 Drawing Sheets

TECHNIQUE AND APPARATUS FOR FABRICATING A FIBER FABRY-PEROT ETALON

TECHNICAL FIELD

This invention relates to a method and apparatus for fabricating a fiber Fabry-Perot etalon. In particular, it relates to an easily created apparatus and practical technique for making fiber Fabry-Perot etalons which are useful as devices for studying light spectra at very high resolution.

DESCRIPTION OF THE PRIOR ART

A Fabry-Perot etalon (FPE) is an optical device that can detect temperature, pressure, or mechanical vibration by detecting and relating a change in optical path length between two highly reflective surfaces, and is commonly used for high-resolution study of optical spectra. Whereas a typical FPE may consist of bulky structures, a fiber FPE is small and flexible.

In many FPEs, multiple reflections occur in an air space, a cavity, between two mirrors with highly reflective inner surfaces. By using an accurately made spacer, parallelism of the inner surfaces can be achieved, maintaining a fixed-plate separation. The high reflectance of the mirrors causes fringes whose widths are very narrow compared to their spacing. A quality index, referred to as the finesse, F, is a measure of the resolution of the FPE. The fitness is the ratio of the fringe separation to the width of the fringe at half the maximum intensity. A high finesse can be achieved by maximizing the mirror reflectivity and minimizing losses due to scatter, absorption, and phase error. In order to make a high resolution spectrum analyzer, the multiple interferences should be scanned over a distance equal to a small increase in the length of the cavity. Typically, this change in cavity length equals half of the wavelength, or approximately 1 $\mu$m.

In fiber FPEs, mirrors or mirror coatings are placed on each end of a predetermined length of fiber waveguide. The fiber is stretched a small distance in a variety of manners thereby causing the resonance of the FPE to be scanned over a range of wavelengths. One such method, as described in "Optical Fibre Fabry-Perot Interferometer With Finesse of 300", J. Stone, *Electronics Letters*, May 23, 1985, Vol. 21, No. 11, pp. 504–505, utilizes a lead zirconate-lead titanate (PZT) piezoelectric ceramic rod. The fiber is attached to this rod using room-temperature-curing Epoweld epoxy manufactured by Hardman, Inc. While laser light is being passed through the fiber/mirror structure, a ramp voltage is applied to the PZT rod, causing longitudinal expansion of the rod and, hence, stretching of the fiber. Another method of making fiber FPEs utilizes a tubular hollow cylinder of piezoelectric material. The fiber/mirror structure is wrapped around the outer surface of the cylinder and affixed thereto using some type of epoxy. When a voltage is applied between the inner and outer surfaces of the cylinder, the cylinder expands radially causing the attached fiber to stretch. For an example of this type of fiber FPE see U.S. Pat. No. 4,482,248 issued Nov. 13, 1984 to Papuchon et al.

Alternate methods of making fiber FPEs utilize magnetic materials. For example, a fiber can be affixed at specific contact points to a piezoelectric or a magnetic substance which expands when an electrical or magnetic field, respectively, is created, thus stretching the fiber. S. J. Petuchowski et al. describe such a method in "A Sensitive Fiber Optic Fabry-Perot Interferometer", *IEEE Journal of Quantum Electronics*, Vol. QE-17, No. 11, November 1981, pp. 2168–2170. A fiber can also be stretched by wrapping a coil around a fiber which has been coated with magnetic material and poled. Again, when current is supplied through the coil, a magnetic field is created, causing the magnetic material and fiber to stretch. Finally, a fiber FPE can be created using the properties of thermal expansion. More specifically, the fiber can be heated by external means, resulting in expansion of the fiber.

The above-mentioned methods of creating fiber FPEs exhibit several disadvantages. Typically, it is desired to scan the fiber FPE quickly, e.g., at a 10 KHz rate. Since it is not possible to cycle the temperature that quickly, thermal expansion methods will no longer work effectively. When using a piezoelectric or magnetic approach, the fiber must be bonded to the expandable material in order to be stretched. This requires a very strong adhesive, one that is more rigid than the glass of the fiber. In addition, most adhesive materials share the stretch with the expandable material. This results in less stretch of the fiber and, thus, requires further expansion of the material being used. For example, a high voltage (approximately 100 V.) is required to expand a PZT piezoelectric material approximately 1 $\mu$m. In the case of a fiber FPE, often an even higher voltage is required for proper expansion due to the give in the adhesive material. A further disadvantage of the prior fiber FPEs is the strain on the fiber at the points where the fiber is bonded to the expandable material. This strain can interfere with the structure's symmetry and the fiber may become birefringent.

Accordingly, the need exists for a method and apparatus for fabricating fiber FPEs which are inexpensively and easily created, exhibit a practical manufacturable form, require relatively weak adhesives, and minimize losses from misalignments.

SUMMARY OF THE INVENTION

In accordance with the present invention, a method for fabricating novel fiber Fabry-Perot etalons is provided. A single mode fiber is cut to the length desired for a given free spectral range (FSR), and the plastic coating is removed from the polished fiber ends. A small area of the glass fiber is then exposed by scraping away the coating near the center of the fiber on one side. Using a breaking tool, the fiber is then broken where the coating has been stripped back. The remainder of the coating holds the two broken pieces together and matched in alignment automatically. Mirrors of desired reflectivity are applied to the fiber ends. The fiber/mirror structure is mounted on a piezoelectric substrate using rigid adhesive at the ends and a resilient adhesive in the center. A voltage is applied to expand the piezoelectric substrate, causing the gap in the fiber also to expand. This expansion provides the scanning mechanism to obtain the spectrum.

BRIEF DESCRIPTION OF THE DRAWING

In the accompanying drawings which illustrate the invention.

DETAILED DESCRIPTION

Figure 2:
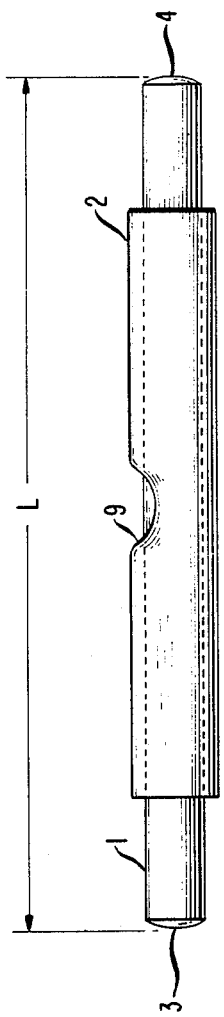
FIG. 2 is an enlarged view of a coated monomode fiber as it is to be used to practice the invention.

FIG. 2 is an enlarged view of a single mode fiber 1 of length, L, which length is predetermined by a given free spectral range, FSR. Ends 3 and 4 of fiber 1 which have been broken perpendicular to the fiber's axis are then squared or polished so that they are slightly convex. Optical fiber 1 is surrounded by coating 2 which is typically made of a plastic material and generally serves to protect the glass fiber from atmospheric elements. Coating 2 is removed from ends 3 and 4 of fiber 1, thereby exposing parts of fiber 1.

Figure 1:
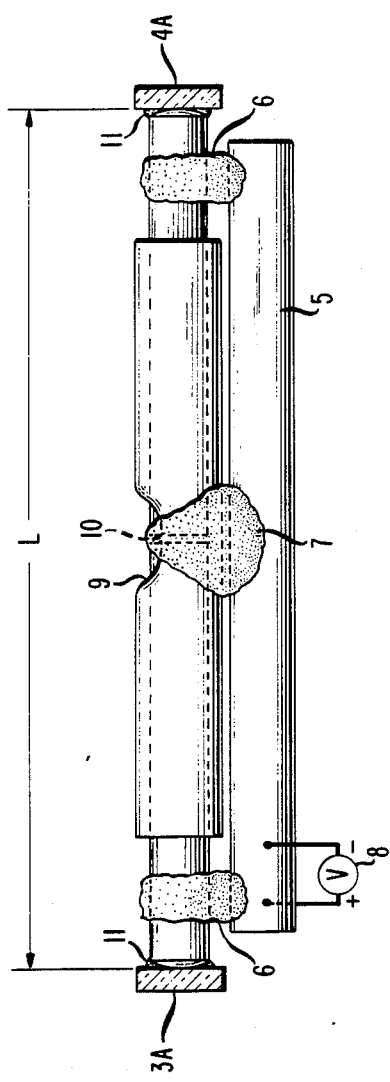
FIG. 1 is a general diagram of a fiber Fabry-Perot etalon according to the invention.

The next step in preparing a fiber Fabry-Perot etalon according to the invention is to scrape away a small piece of coating 2 near the center of fiber 1 on one side, thereby forming cavity 9, and exposing a small section of the glass fiber 1. As shown in FIG. 1, fiber 1 is then broken at cavity 9, thereby forming gap 10. The remainder of coating 2 holds broken fiber 1 together and automatically matches the pieces in alignment.

Discrete mirrors 3A and 4A of desired reflectivity are applied to ends 3 and 4 respectively. Mirrors 3A and 4A are chosen based on considerations of internal properties such as reflection and losses, and geometrics, e.g., how the mirror reflects. Mirrors 3A and 4A are placed against ends 3 and 4, respectively, of fiber 1 and then titled with respect to the fiber's axis until the desired alignment is achieved. Mirrors 3A and 4A are then bonded into place with epoxy 11. In lieu of discrete mirrors, alternate techniques of achieving reflectivity can be used, such as the application of multilayer dielectric coatings to the fiber ends.

The fiber/mirror structure is then mounted on a piezoelectric ceramic rod 5 with rigid adhesive at points 6 and resilient adhesive at point 7. The rigid adhesive locks fiber 1 to the piezoelectric rod 5 so that when a voltage 8 is applied to cause expansion of rod 5, fiber gap 10 will expand accordingly. The rigid adhesive should be a type of epoxy which will cure at room temperature in small volume amounts, such that negligible strain is generated during the curing process. Epoweld epoxy (No. 3672 part A, No. 8173 part B) manufactured by Hardman, Inc. is an example of such an adhesive.

To reduce possible interference, the resilient adhesive must be transparent and must wet the glass fiber to keep out any air interference. A clear, low-viscosity or thixotropic, room-temperature-vulcanizing (RTV) silicone rubber will satisfy this criteria. In addition, a small amount of viscous silicone oil may be applied to gap 10 such that the region where light propagates is covered. It is better if this liquid index-matches gap 10 so that any resulting reflections are negligible. Using a soft adhesive at point 7 offers several advantages. The adhesive at point 7 holds the alignment of the fiber pieces. In addition, the stretching of coating 2 at point 7 produces minimal strain on fiber 1 thereby resulting in negligible losses and avoidign birefrigerence. When stretched, fiber gap 10 opens a sufficiently small amount so that any loss due to diffraction is negligible. (See "Loss Analysis of Single Mode Fiber Splices", D. Marcuse, *BSTJ*, Vol. 56, No. 5, May-June 1977, pp. 703–718).

Figure 3:
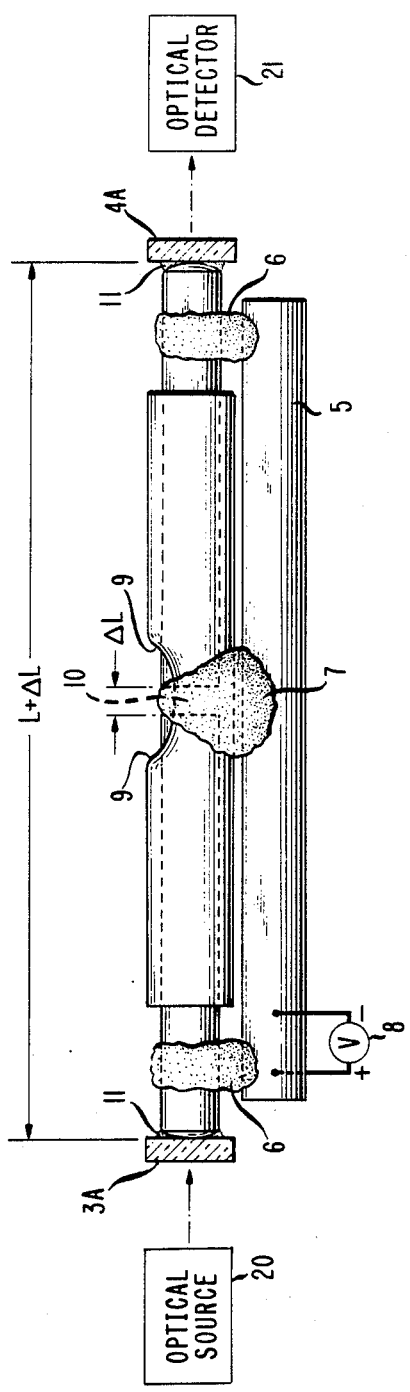
FIG. 3 is an embodiment of the invention in operation.

As shown in FIG. 3, a ramp voltage 8 is applied to the top and bottom faces of the piezoelectric rod 5. This ramp voltage 8 applied to rod 5 in the transverse direction, opposite to the poling direction, gives longitudinal expansion of rod 5 thereby stretching fiber 1 and widening fiber gap 10. This expansion of fiber gap 10 provides the scanning means to obtain the spectrum of resonant wavelengths as light is passed from optical source 20 through the fiber FPE to optical detector 21.

As mentioned above, the free spectral range, FSR, is related to the length, L of the fiber:

$$FSR = c/2NL$$

where (in frequency units)
c = velocity of light,
N = index of the fiber, and
L = length of the fiber.

As fiber 1 is expanded, gap 10 increases in length by an amount $\Delta L$. To scan through one FSR, this gap interval, $\Delta L$, must equal $\lambda/2n$, where $\lambda$ is the wavelength and n is the index of refraction of the medium which changes the gap length. Typically $\lambda$ equals approximately 1.5μm, so that the gap interval to be scanned is less than one micron. According to the present invention, this distance can easily be obtained with moderate voltages (in the range of 100 v.) applied to the piezoelectric rod 5, since it is the coating 2 that is being stretched.

It would be entirely possible to configure a fiber FPE without gap 10. The disadvantage to this alternative is that a much higher voltage must be applied to the piezoelectric substrate, since the elasticity of the adhesive takes up some of the stretching of the pizoelectric substrate.

Figure 4:
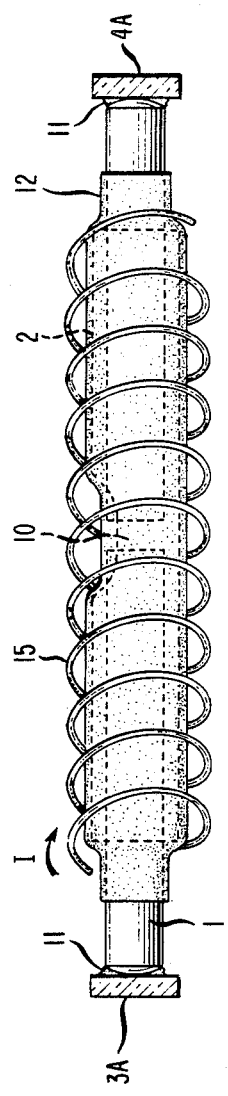
FIG. 4 is an alternative embodiment of the invention.

Alternative embodiments of the present invention may be utilized to expand the fiber gap 10. For example, as shown in FIG. 4, the glass fiber 1 and/or fiber coating 2 may be coated with an additional coating 12 of a metallic material such as nickel. Coil 15 is then wrapped around the metallic coated fiber structure and poled. Current I is sent through coil 15, causing expansion of the fiber structure and, hence, fiber gap 10. Another method to obtain expansion of the fiber gap 10 is to wrap thin sheets of amorphous magnetic materials around the fiber and bond such sheets to the fiber. Again, a coil is then wrapped around the resulting structure, current is supplied to the coil, and expansion is achieved. Expansion of the fiber gap can also be achieved by thermal or mechanical means.

The finesse of a Fabry-Perot etalon is a measure of the resolution obtained. A high finesse can be achieved by maximizing the mirror reflectivity and minimizing scattering and absorption losses due to phase errors and misalignments. The present invention provides a high finesse and good performance.

Some prior methods require costly temperature stabilizing elements to compensate for thermal drift. The present invention involves expanding a plastic coating and glass which has a low thermal expansion coefficient, and, consequently, the fiber FPE does not require costly temperature stabilizing elements. The present invention exhibits a form which is practical, manufacturable, straightforward, and relatively inexpensive.

This invention has been described with reference to preferred embodiments. It should be realized that all obvious modifications and alterations are included insofar as they come within the scope and spirit of the claimed invention.

What is claimed is:

1. A high-sensitivity Fabry-Perot etalon comprising at least two single mode optical fiber segments, each segment having a first and second end;

a protective coating surrounding substantially all of the two fiber segments such that the first end of each segment is aligned and physically held in position with respect to the first end of the other segment;

partially reflecting means adjacent to the second end of each of the fiber segments for creating a Fabry-Perot etalon including the two optical fiber segments; and means for stretching said protective coating thereby causing a variation in the length of said Fabry-Perot etalon.

2. A high-sensitivity Fabry-Perot etalon as in claim 1 wherein said means for stretching comprises a piezoelectric ceramic rod, poled transversely, having first and second ends, said rod being attached to said opticalfiber segments; and means for applying a voltage to said rod in a transverse direction, thereby providing longitudinal expansion of said rod.

3. A high-sensitivity Fabry-Perot etalon as in claim 1 wherein said means for stretching comprises an additional coating of amorphous metallic, magnetic material applied to said fiber segments and said remaining protective coating;

a coil wrapped around said fiber; and means for applying a current through said coil, thereby providing longitudinal expansion of said Fabry-Perot etalon.

4. A high-sensitivity Fabry-Perot etalon as in claim 1 wherein said means for stretching comprises thin sheets of amorphous metallic, magnetic material wrapped around said fiber segments;

a coil wrapped around said sheets; and means for applying a current through said coil, thereby providing longitudinal expansion of said Fabry-Perot etalon.

5. A high-sensitivity Fabry-Perot etalon as in claim 1 wherein said partially reflecting means comprises mirrors aligned against the second end of each of the fiber segments.

6. A high-sensitivity Fabry-Perot etalon as in claim 1 wherein said partially reflecting means comprises multiple layers of dielectric coatings applied to said second end of said fiber segments.

7. A method for fabricating a fiber Fabry-Perot etalon from a predetermined length of optical fiber having first and second ends and being substantially surrounded by a protective coating, said method comprising the steps of:

exposing a small area of said opticalfiber by removing a part of said protective coating;

breaking the optical fiber at a point where the protective coating has been removed such that the remaining protective coating is left intact, and a gap in the fiber is formed thereby; and positioning a reflector on said first and second ends of said length of fiber.

8. The method recited in claim 7 wherein the step of placing a reflector on said first and second ends includes coating said first and second ends with multiple layers of dielectric material.

9. The method recited in claim 7 wherein the step of placing a reflector on said first and second ends includes aligning discrete mirrors against said first and second fiber ends.

10. The method recited in claim 9, wherein the method includes the additional step of bonding said mirrors to said fiber ends.

11. The method recited in claim 7, wherein the method includes the additional step of polishing said first and second ends of said optical fiber such that slightly convex surfaces are thereby formed.

* * * * *